US005470940A

United States Patent [19]

Otani et al.

[11] Patent Number: 5,470,940

[45] Date of Patent: Nov. 28, 1995

[54] TRANSFER MATERIAL SUPPORTING MEMBER AND IMAGE FORMING DEVICE USING THIS TRANSFER MATERIAL SUPPORTING MEMBER

[75] Inventors: Noriko Otani; Teigo Sakakibara, both of Yokohama, Japan

[73] Assignee: Canon Kabushiki Kaisha, Tokyo, Japan

[21] Appl. No.: 80,495

[22] Filed: Jun. 24, 1993

[30] Foreign Application Priority Data

Jun. 29, 1992 [JP] Japan .................................... 4-192809
Jun. 29, 1992 [JP] Japan .................................... 4-192810

[51] Int. Cl.$^6$ ........................................................ B32B 9/00

[52] U.S. Cl. .......................... 528/204; 524/413; 524/424; 524/430; 524/433; 252/500; 252/502; 252/512; 252/518; 428/327

[58] Field of Search .................... 528/204; 524/401–413, 524/424, 430

[56] References Cited

U.S. PATENT DOCUMENTS

| | | | |
|---|---|---|---|
| 3,849,188 | 11/1974 | Suzuki et al. | 117/201 |
| 4,732,949 | 3/1988 | Paul et al. | 525/464 |
| 4,985,326 | 6/1991 | Sakamoto | 430/96 |

FOREIGN PATENT DOCUMENTS

| | | | |
|---|---|---|---|
| 0329991 | 8/1989 | European Pat. Off. . | |
| 0411192 | 2/1991 | European Pat. Off. . | |
| 0506109 | 9/1992 | European Pat. Off. . | |
| 60-10625 | 1/1985 | Japan | H01L 21/302 |

OTHER PUBLICATIONS

Smirnova, et al., "Polycarbonates and . . . from di–(4–hydroxyphenyl) oxide", Polymer Science, USSR, vol. 12, No. 5, 1970, pp. 1344–1351.
JP04298529A2 by Noriko Otani et al.

*Primary Examiner*—Patrick J. Ryan
*Assistant Examiner*—Kam F. Lee
*Attorney, Agent, or Firm*—Fitzpatrick, Cella, Harper & Scinto

[57] ABSTRACT

A transfer material supporting member is disclosed which contains at least a polymer represented by the formula (1)

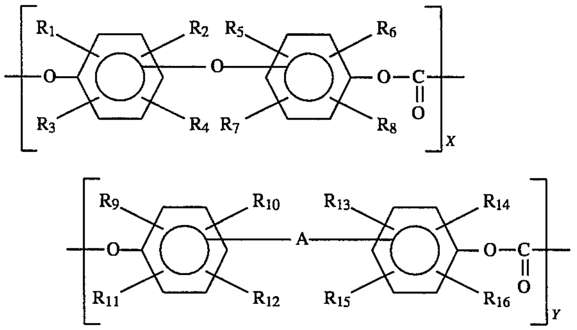

wherein each of $R_1$ to $R_{16}$ is a hydrogen atom, a halogen atom or an alkyl group, A is a divalent group, and each of X and Y is a copolymerization ratio. Also, an image forming device using the transfer material supporting member is disclosed.

6 Claims, 4 Drawing Sheets

TRANSFER MATERIAL SUPPORTING MEMBER AND IMAGE FORMING DEVICE USING THIS TRANSFER MATERIAL SUPPORTING MEMBER

BACKGROUND OF THE INVENTION

1. Field of the Invention

The present invention relates to a transfer material supporting member and an image forming device using this transfer material supporting member.

2. Related Background Art

Heretofore, as image forming devices, there have been various devices such as electrophotographic copiers and printers. In these image forming devices, a toner or an ink is transferred to a transfer material such as a recording paper or a plastic film to thereby achieve recording. In a recording step, a transfer material such as the recording paper or the plastic film is supported on a transfer material supporting member.

For example, in the electrophotographic device, the transfer material supporting member undergoes mechanical and electrical external forces in steps of the carriage of the transfer material, transfer charging, deelectrification, cleaning and the like, and therefore the transfer material supporting member is required to have durability to these external forces, i.e., various characteristics which are excellent in mechanical strength, wear resistance, electrical durability and lubricating properties to a cleaning member and the like.

Particularly in recent years, in order to further improve image quality, the so-called small diameter toner particles having a particle diameter of 10 μm or less and an average particle diameter of about 8 μm have been used as a developing agent. In consequence, conditions for cleaning the toner which adheres to the transfer material supporting member are required to be severer.

As the transfer material supporting member, resin films of Teflon, polyester, polyvinylidene fluoride, triacetate, polycarbonate and the like have been heretofore used, but in the conventional transfer material supporting member, a crack occurs on its surface sometimes owing to the adhesion of a machine oil or the above-mentioned mechanical or electrical external force. If the crack takes place in the transfer material supporting member, electrical properties in the cracked portion change, so that transfer nonuniformity (the nonuniformity of an amount of the transferred toner) and transfer defect (no transfer of the toner) tend to occur at the time of the transfer of the toner to the transfer material.

SUMMARY OF THE INVENTION

An object of the present invention is to provide a transfer material supporting member which is excellent in durability, i.e., which is not cracked even by the adhesion of a machine oil or a mechanical or electrical force, and another object of the present invention is to provide an image forming device using this transfer material supporting member.

A transfer material supporting member of the present invention contains a polymer represented by the formula (1)

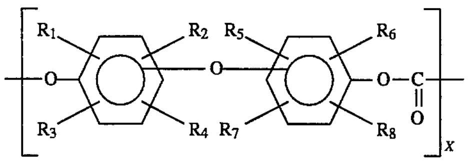

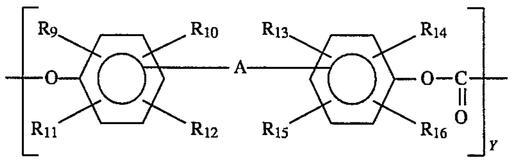

wherein each of $R_1$ to $R_{16}$ is a hydrogen atom, a halogen atom or an alkyl group, A is a divalent group, and each of X and Y is a copolymerization ratio.

Furthermore, an image forming device of the present invention comprises an electrophotographic photosensitive member, a charging means for charging the electrophotographic photosensitive member, an image exposing means for exposing an image to light on the charged electrophotographic photosensitive member to form an electrostatic latent image thereon, a developing means for developing the electrostatic latent image formed on the electrophotographic photosensitive member with a toner to form a toner image, and a transfer material supporting member for supporting a transfer material to which the toner image is transferred.

DETAILED DESCRIPTION OF THE PREFERRED EMBODIMENTS

Figure 1:
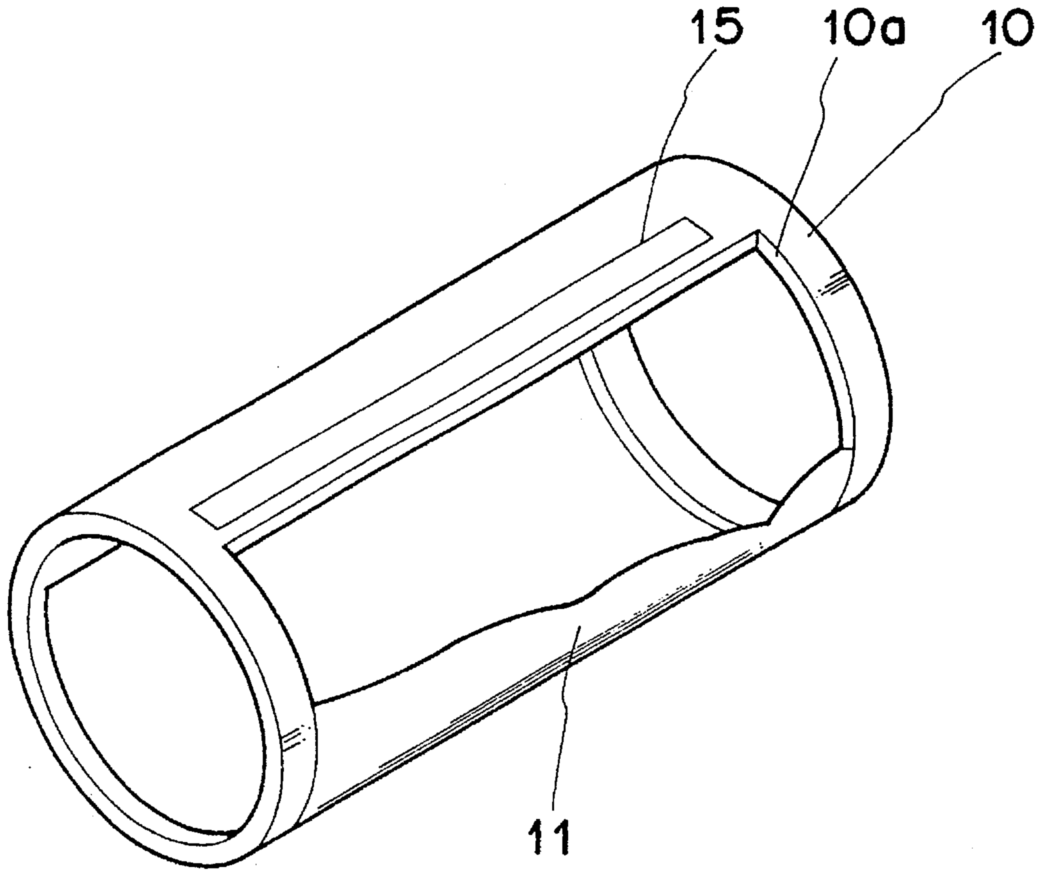
FIG. 1 is a perspective view showing one embodiment of a cylinder provided with a transfer material supporting member of the present invention.

A transfer material supporting member of the present invention contains a polymer represented by the following formula (1). Furthermore, another transfer material supporting member of the present invention contains a polymer represented by the following formula (1) and electrically conductive fine particles.

Formula (1)

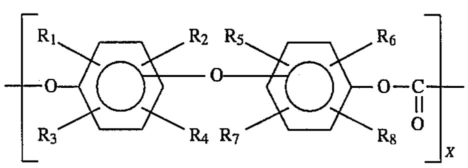

-continued

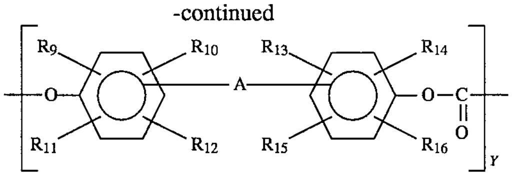

In the above formula (1), each of $R_1$ to $R_{16}$ is a hydrogen atom, a halogen atom or an alkyl group, and the alkyl group preferably has 1 to 5 carbon atoms.

The group A in the formula (1) is a divalent group, and it preferably has 1 to 8 carbon atoms or a sulfur atom.

Each of X and Y is a copolymerization ratio, and a ratio of X:Y is preferably in the range of 5:95 to 80:20.

The molecular weight of the polymer having the formula (1) is preferably in the range of 10,000 to 100,000 in terms of a viscosity average molecular weight.

The polymer of the formula (1) is a polycarbonate resin to which flexibility is given, and thus it scarcely cracks.

The polymer of the formula (1) can be synthesized, for example, by an interfacial polymerization without secondarily producing a homopolymer.

Preferable examples of monomers which can be used to synthesize the polymer of the formula (1) are as follows:

(1)

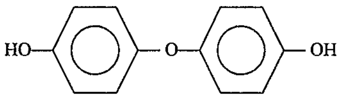

(2)

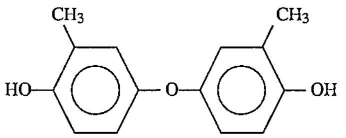

(3)

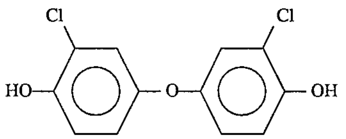

(4)

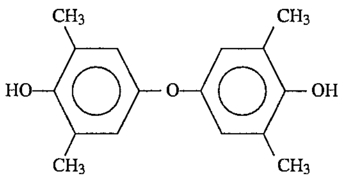

(5)

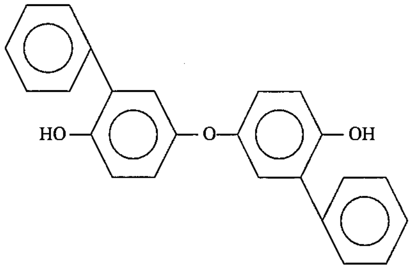

-continued (6)

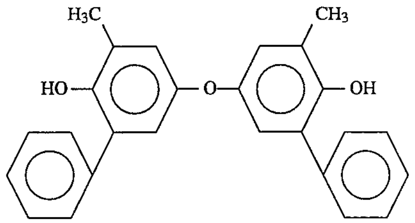

(7)

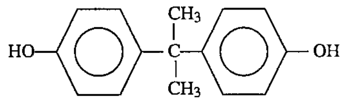

(8)

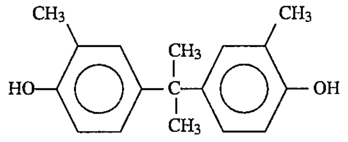

(9)

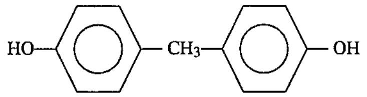

(10)

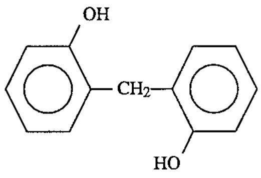

(11)

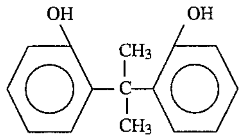

(12)

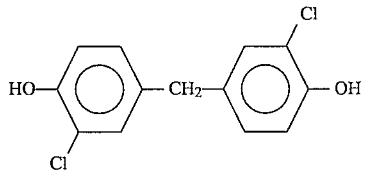

(13)

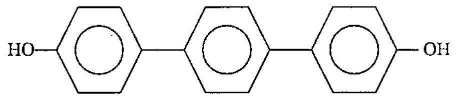

(14)

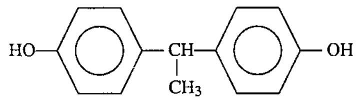

(15)

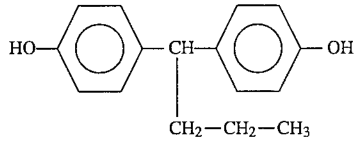

-continued (16)

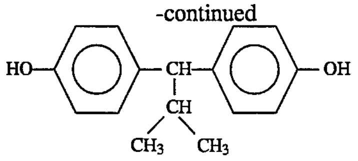

(17)

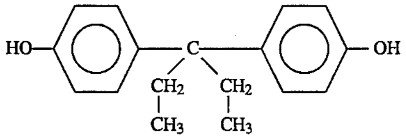

(18)

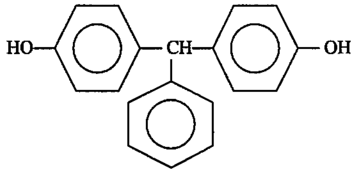

(19)

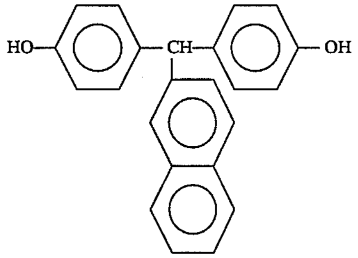

(20)

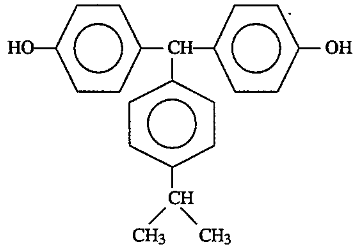

(21)

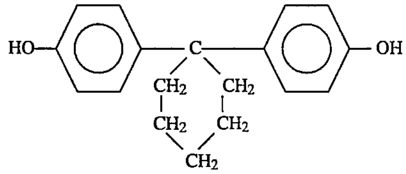

(22)

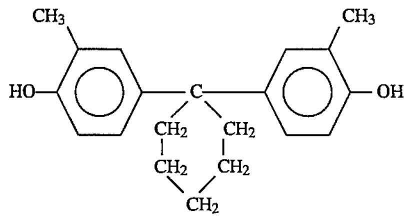

(23)

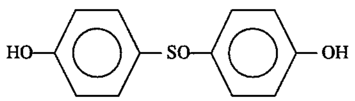

(24)

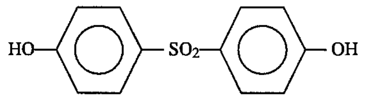

-continued (25)

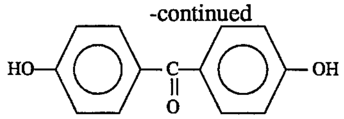

(26)

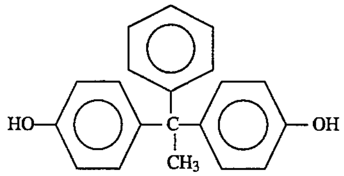

(27)

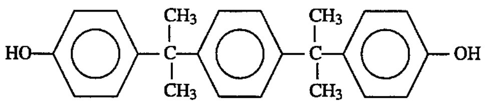

(28)

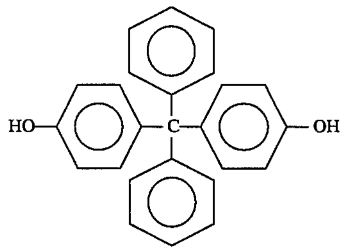

As shown in FIG. 1, the transfer material supporting member of the present invention is attached to, for example, a cylinder 10 having an opening 10*a* in the outer peripheral surface thereof, when used. In FIG. 1, the transfer material supporting member 11 of the present invention is partially omitted so as to make the opening 10*a* seen, but in fact, the opening 10*a* is closed with the transfer material supporting member 11.

Figure 2:
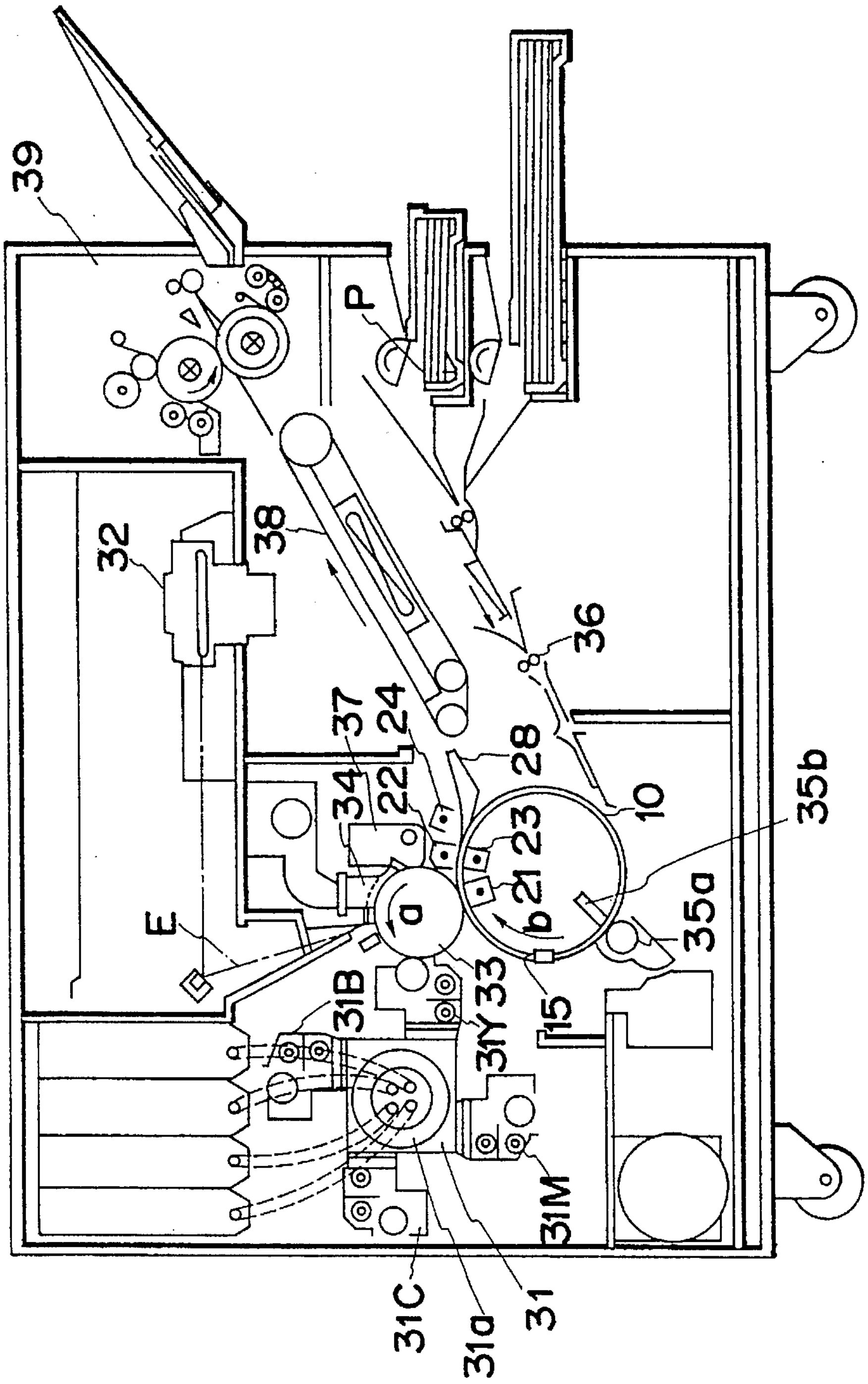
FIG. 2 is a side view showing one embodiment of an image forming device using the transfer material supporting member of the present invention.
Figure 3:
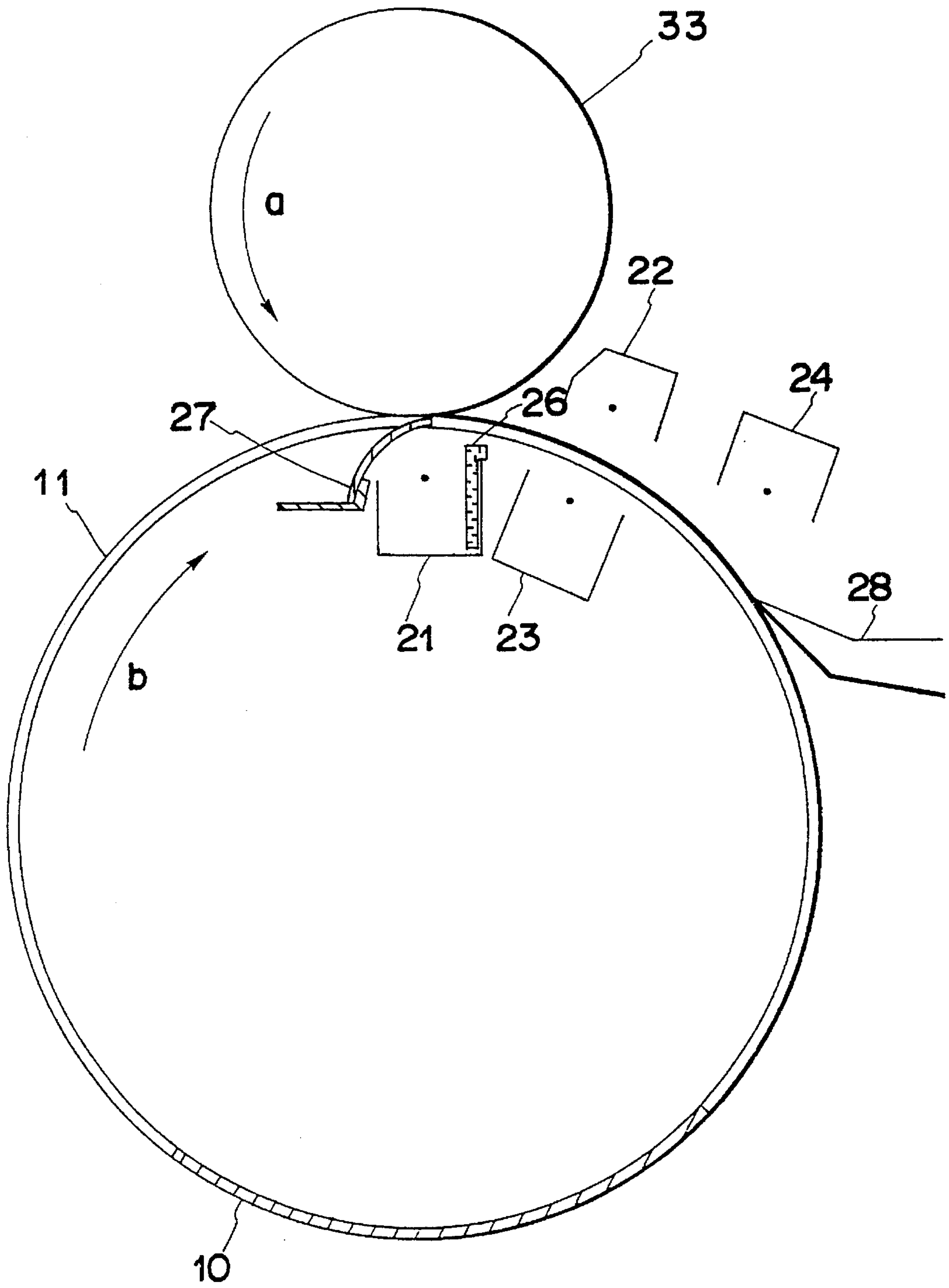
FIG. 3 is a side view showing a relation between the transfer material supporting member of the present invention and an electrophotographic photosensitive member.

The cylinder 10 is provided with a gripper 15 adjacent to the opening 10*a*. A transfer material such as a recording paper or a plastic film to be recorded thereon is gripped at the edge thereof by the gripper 15, so that the transfer material is supported on the transfer material supporting member 11. FIGS. 2 and 3 show an embodiment of an image forming device provided with the cylinder 10 to which the transfer material supporting member 11 of the present invention is attached. In the electrophotographic device shown in FIG. 2, a drum type photosensitive member is used as an image support.

In FIG. 2, reference numeral 33 is a drum type photosensitive member which can be rotated at a predetermined peripheral speed in the direction of an arrow a. An image forming means is arranged around the drum type photosensitive member 33. The image forming means is composed of at least a primary charger 34 for uniformly charging the photosensitive member 33, an exposing means 32 comprising, for example, a laser beam exposure equipment for radiating a light image E to form an electrostatic latent image on the drum type photosensitive member 33, and a rotary developing equipment 31 for converting the electrostatic latent image on the drum type photosensitive member 33 into a visible image.

The rotary developing equipment 31 is composed of four developing units 31Y, 31M, 31C and 31B for receiving four color developers of a yellow developer, a magenta developer, a cyan developer and a black developer, respectively, and a cylindrical container 31*a* for supporting and rotating these four developing units. The rotary developing equipment 31 rotates the container 31*a* to carry the certain developing unit to a position where the developing unit confronts the outer peripheral surface of the photosensitive member 33, and the electrostatic latent image on the photosensitive member 33 is then developed with the developer, whereby the visible image, i.e., the toner image is formed on the photosensitive member 33.

The cylinder 10 provided with the transfer material supporting member of the present invention is disposed adjacent to the photosensitive member 33, and on the outer peripheral surface of the cylinder 10, a transfer material P sent from a paper feed section by a registration roller 36 is supported. A discharger 21 for transfer and a discharger 23 for deelectrification are arranged inside the cylinder 10, and dischargers 22 and 24 for deelectrification are arranged outside the cylinder 10.

When the photosensitive member 33 is rotated in the direction of the arrow a and the cylinder 10 is rotated in the direction of the arrow b, the toner image on the photosensitive member 33 is brought into contact with the transfer material P supported on the transfer material supporting member 11. The toner image is subjected to corona discharge of a polarity opposite to that of the toner by the discharger 21 for transfer, whereby the toner image is transferred to the transfer material P. In order to form a multi-color image, the transfer of the toner image is repeated necessary times.

The transfer material P to which the toner image has been transferred is released from the transfer material supporting member 11 by the function of a separating nail 28, while subjected to a deelectrification treatment by the dischargers 22, 23 and 24 for deelectrification, and the transfer material P is then carried to a fixing equipment 39 by a carrying belt 38. The image on the transfer material P is fixed by heat from the fixing equipment 39, and then the transfer material P is discharged from the device.

On the other hand, the remaining toner on the surface of the photosensitive member 33 is removed by a cleaner 37, and the cleaned photosensitive member 33 is kept ready for the next image formation.

Furthermore, the surface of the transfer material supporting member 11 of the cylinder 10 is similarly cleaned by a cleaner 35*a* and a cleaning auxiliary means 35*b*, and the cleaned transfer material supporting member 11 is kept ready for the next image formation.

As shown in FIG. 3, the discharger 21 for transfer is provided with an insulating member 26 of a polycarbonate resin plate or the like, and in this case, the quantity of the transfer corona fed to the photosensitive member 33 increases.

A pressing member 27 shown in FIG. 3 can be disposed, if necessary, and it works to prevent the deformation of the transfer material supporting member 11. This pressing member 27 is preferably made from a synthetic resin film of polyethylene, polypropylene, polyester, polyethylene terephthalate or the like having a volume resistivity of, preferably $10^{10}$ Ω.cm or more, more preferably $10^{14}$ Ω.cm or more.

Figure 4:
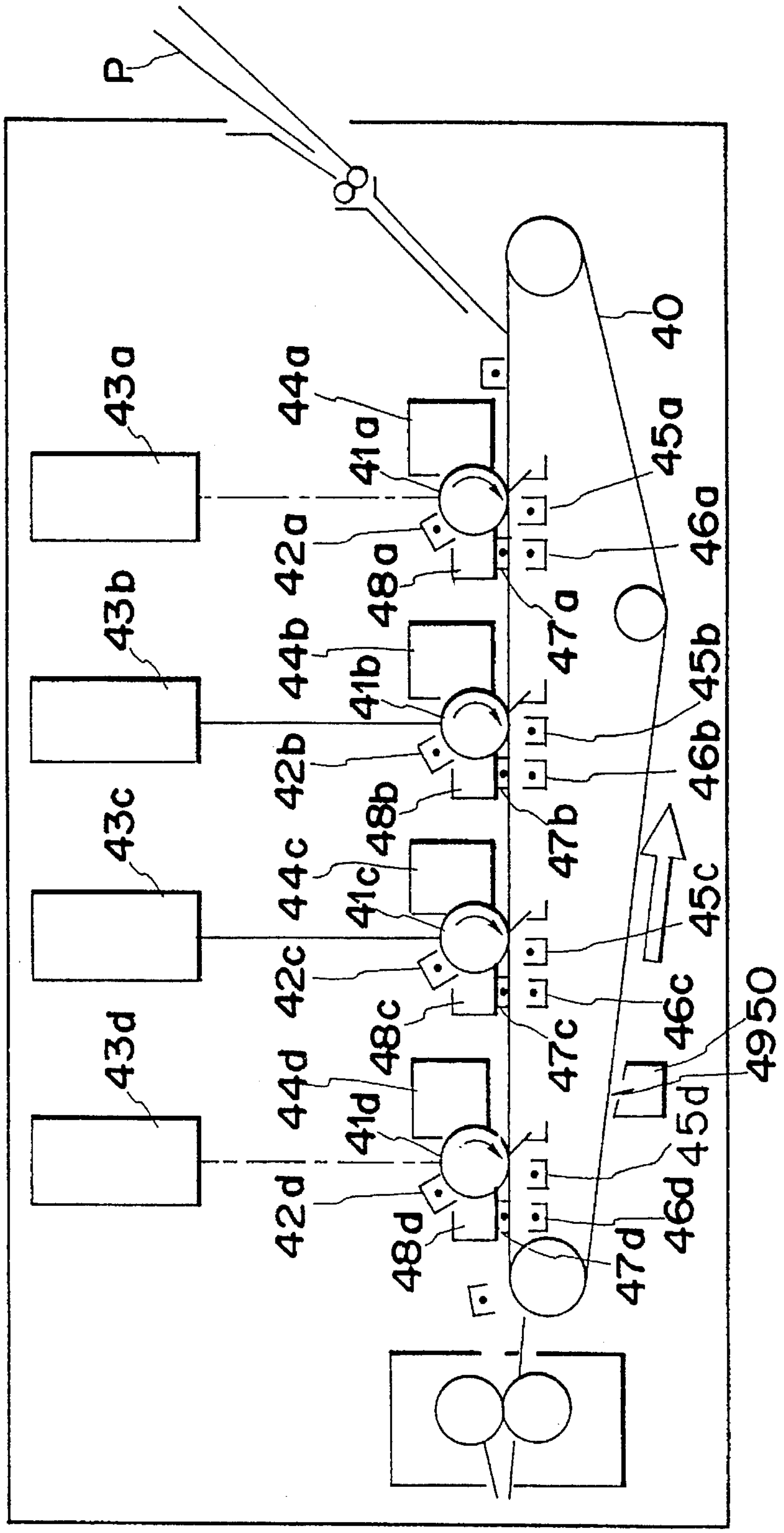
FIG. 4 is a side view showing another embodiment of the image forming device using the transfer material supporting member of the present invention.

The transfer material supporting member 11 of the present invention may be constituted in the form of an endless belt, as shown in FIG. 4.

An image forming device shown in FIG. 4 has photosensitive members 41*a* to 41*d*, and around these photosensitive members, there are disposed primary chargers 42*a* to 42*d*, exposing means 43*a* to 43*d*, developing units 44*a* to 44*d*, dischargers 45*a* to 45*d* for transfer, dischargers 46*a* to 46*d* and 47*a* to 47*d* for deelectrification, and cleaners 48*a* to 48*d* for the photosensitive members. In addition, under the photosensitive members 41*a* to 41*d*, a transfer material supporting member 40 having an endless belt structure of the present invention is arranged. A developer which adheres to the transfer material supporting member is removed by a cleaner 50 for the transfer material supporting member having a urethane blade 49.

The transfer material supporting member of the present invention may contain electrically conductive fine particles. The transfer material and the transfer material supporting member are charged by release discharge caused at the time of releasing the transfer material from the photosensitive member, and as a result, the toner image transferred on the transfer material is disordered sometimes by the charge held on the transfer material and the transfer material supporting member. However, when the conductive fine particles are contained in the transfer material supporting member, the transfer material and the transfer material supporting member can be prevented from charging, so that the image is not disordered any more. In this connection, it is described in Japanese Patent Application Laid-open No. 60-10625 to disperse carbon black in the transfer material supporting member. However, the conventional transfer material supporting member makes it difficult to uniformly disperse carbon black therein. On the contrary, the polymer of the formula (1) which is used in the present invention allows the conductive fine particles to uniformly disperse, whereby the transfer material supporting member can possess a desired resistance.

The volume resistivity of the transfer material supporting member according to the present invention is preferably $1\times10^2$ to $1\times10^{17}$ Ω.cm, more preferably $1\times 10^5$ to $1\times10^{16}$ Ω.cm. In the present invention, the volume resistivity is a value determined by applying a voltage in a ratio of 10 V per μm of thickness. Moreover, the dielectric constant of the transfer material supporting member according to the present invention is preferably 2.5 or more.

Preferable examples of the electrically conductive fine particles to be contained in the transfer material supporting member of the present invention include conductive carbon blacks (superconductive furnace black, conductive furnace black, extra conductive furnace black, superabrasion furnace black, fibril carbon and the like), ITO, $SnO_2$, $TiO_2$, $BaSO_4$, metal particles (aluminum, gold and the like). Above all, the conductive carbon blacks are particularly preferable.

The amount of the conductive fine particles is preferably from 0.1 to 30 parts by weight, more preferably from 1.0 to 20 parts by weight based on 100 parts by weight of the transfer material supporting member according to the present invention. Moreover, the specific surface area of the conductive fine particles is preferably from 100 to 2,000 $m^2/g$, more preferably from 400 to 1,500 $m^2/g$.

Some additives may be added to the transfer material supporting member of the present invention, and examples of the additives include a stabilizer (phosphorous acid, a phosphite or the like), an antioxidant, a flame retardant, a lubricant and a release agent.

The thickness of the transfer material supporting member of the present invention is preferably from 50 to 300 μm, more preferably from 70 to 200 μm.

The transfer material supporting member of the present invention may be what is obtained by further copolymerizing the copolymer of the formula (1) and another monomer.

The transfer material supporting member of the present invention can be obtained, for example, by extrusion molding or injection molding, and it may be in the form of a sheet or an endless belt. The transfer material supporting member having the structure of the endless belt can be obtained by connecting both the ends of the sheet-like transfer material supporting member by thermal fusion bond or ultrasonic fusion bond, or with an adhesive.

The transfer material supporting member of the present invention is excellent in electrical durability, mechanical durability and oil resistance, and therefore it can be repeatedly used. The cleaning state on the transfer material supporting member is satisfactory, and therefore good images can always stably be obtained. In particular, even when the developer of particles having a small particle diameter is used, the transfer material supporting member of the present invention can provide the good image.

Now, the present invention will be described in detail in reference to examples, but the scope of the present invention should not be limited to these examples.

EXAMPLE 1

A 120-μm-thick transfer material supporting member of the present invention was prepared from a polymer (viscosity average molecular weight $3.15\times10^4$) having the structural formula

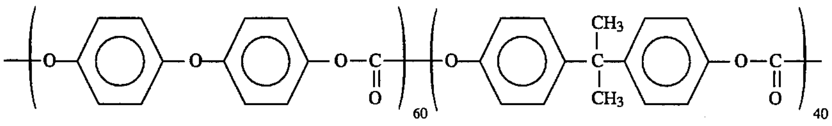

by extrusion molding.

The thus prepared transfer material supporting member was attached to an opening 10*a* of a cylinder 10 as shown in FIG. 1, and the cylinder 10 was mounted on an image forming device as shown in FIG. 2.

This cylinder 10 was made from aluminum and had a length of 380 mm and an outer diameter of 160 mm. A size of the opening 10*a* was as follows: if the outer peripheral surface of the cylinder 10 is developed into a plane, the length of its one side parallel to the rotational axis of the cylinder 10 was 350 mm and that of its other side was 450 mm.

In the image forming device, the opening width of a discharger 21 for transfer was 19 mm, and the distance between a discharge wire of the discharger 21 for transfer and the outer peripheral surface of the photosensitive member 33 was 10.5 mm. In addition, the distance between a discharge wire of the discharger 21 for transfer and the bottom surface of a shield plate of the transfer corona discharger 21 was 16 mm. As a pressing member 27, there was used a polyethylene terephthalate resin film.

By the use of this image forming device, monochromatic images were formed on 10,000 transfer materials as a durability test. The formation of each image was achieved by charging the photosensitive member 33 in a negative state, exposing the image, and then carrying out reversal development with a toner having an average particle diameter of 8 μm. In the operation of the image formation, the peripheral speed of the photosensitive member 33 and the cylinder 10 was 160 mm/sec. The results of the durability test are shown in Table 1.

On the other hand, for the transfer material supporting member prepared in this example, an oil resistance test was made. The evaluation of the oil resistance was given as follows: the transfer material supporting member was coated with a machine oil (trade name Uniway 180, made by Nippon Oil Co., Ltd.), and then allowed to stand for one week, and tensile break strength was measured by the use of a tensile tester SV-55 made by Imada Seisakusho Co., Ltd. The oil resistance was evaluated from a change between the measured values before and after the test. The results of the oil resistance test are shown in Table 1.

EXAMPLE 2

A transfer material supporting member of the present invention was obtained by the same procedure as in Example 1 except that a polymer used in Example 1 was replaced with a polymer (viscosity average molecular weight $2.52\times10^4$) having the structural formula:

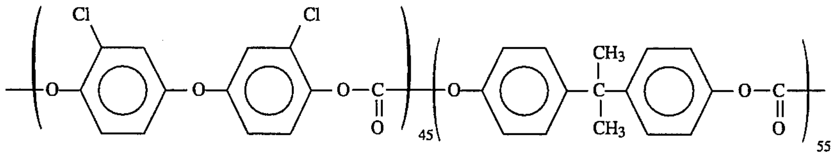

For the thus obtained transfer material supporting member, a durability test and an oil resistance test were made in the same manners as in Example 1. The results of the tests are shown in Table 1.

EXAMPLE 3

A transfer material supporting member of the present invention was obtained by the same procedure as in Example 1 except that a polymer used in Example 1 was replaced with a polymer (viscosity average molecular weight $2.15\times10^4$) having the structural formula:

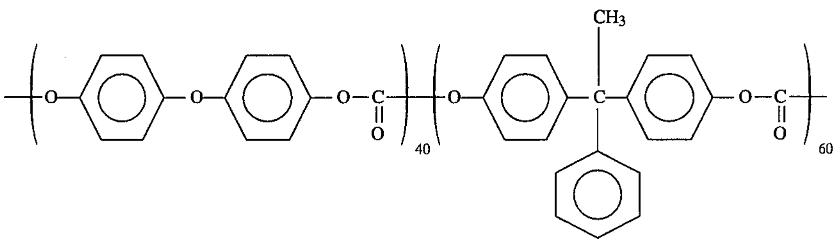

For the thus obtained transfer material supporting member, a durability test and an oil resistance test were made in the same manners as in Example 1. The results of the tests are shown in Table 1.

EXAMPLE 4

A transfer material supporting member of the present invention was obtained by the same procedure as in Example 1 except that a polymer used in Example 1 was replaced with a polymer (viscosity average molecular weight $2.90\times10^4$) having the structural formula:

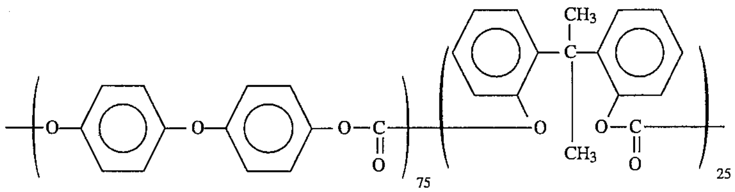

For the thus obtained transfer material supporting member, a durability test and an oil resistance test were made in the same manners as in Example 1. The results of the tests are shown in Table 1.

EXAMPLE 5

A transfer material supporting member having an endless belt structure of the present invention was obtained by extruding a polymer (viscosity average molecular weight $3.51\times10^4$) having the structural formula

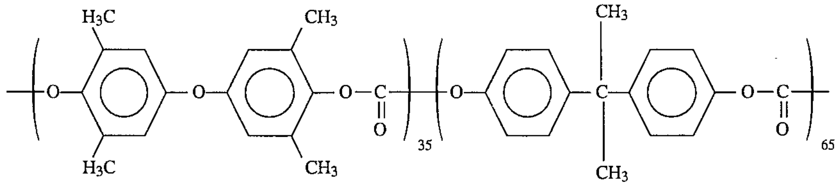

to form a resin film of 130 μm in thickness, and then connecting both the ends of the resin film by thermal fusion bond.

The thus obtained transfer material supporting member was mounted on an image forming device shown in FIG. 4, and monochromatic images were formed on 10,000 transfer materials with the same toner as in Example 1 for the sake of a durability test. The results of the durability test are shown in Table 1.

Furthermore, for the transfer material supporting member obtained in this example, an oil resistance test was made in the same manner as in Example 1. The results of the oil resistance test are shown in Table 1.

EXAMPLE 6

A transfer material supporting member of the present invention was obtained by the same procedure as in Example 5 except that a polymer used in Example 5 was replaced with a polymer (viscosity average molecular weight $5.08\times10^4$) having the structural formula:

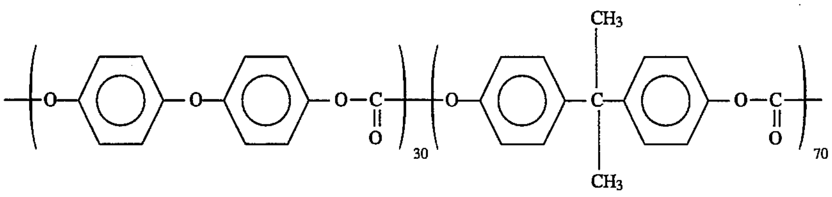

For the thus obtained transfer material supporting member, a durability test and an oil resistance test were made in the same manners as in Example 5. The results of the tests are shown in Table 1.

EXAMPLE 7

A transfer material supporting member of the present invention was obtained by the same procedure as in Example 5 except that a polymer used in Example 5 was replaced with a polymer (viscosity average molecular weight $3.05\times10^4$) having the structural formula:

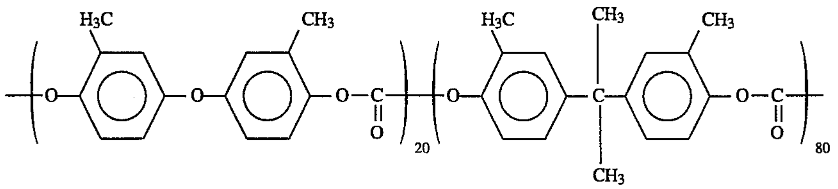

For the thus obtained transfer material supporting member, a durability test and an oil resistance test were made in the same manners as in Example 5. The results of the tests are shown in Table 1.

EXAMPLE 8

A transfer material supporting member of the present invention was obtained by the same procedure as in Example 5 except that a polymer used in Example 5 was replaced with a polymer (viscosity average molecular weight $2.05\times10^4$) having the structural formula:

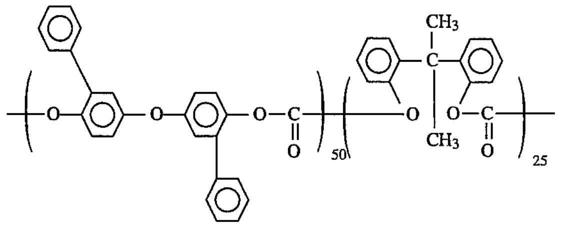

For the thus obtained transfer material supporting member, a durability test and an oil resistance test were made in the same manners as in Example 5. The results of the tests are shown in Table 1.

COMPARATIVE EXAMPLE 1

A transfer material supporting member was obtained by the same procedure as in Example 1 except that a polymer used in Example 1 was replaced with Polycarbonate Z (viscosity average molecular weight $2.39\times10^4$).

For the thus obtained transfer material supporting member, a durability test and an oil resistance test were made in the same manners as in Example 1. The results of the tests are shown in Table 1.

COMPARATIVE EXAMPLE 2

A transfer material supporting member of the present invention was obtained by the same procedure as in Example 5 except that a polymer used in Example 5 was replaced with a polymer (weight average molecular weight $3.08\times10^4$) having the structural formula:

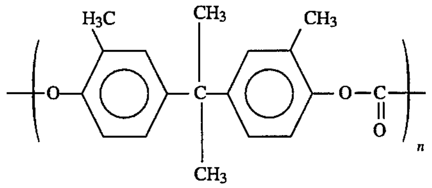

For the thus obtained transfer material supporting member, a durability test and an oil resistance test were made in the same manners as in Example 5. The results of the tests are shown in Table 1.

TABLE 1

| | Oil Resistance Test | | Durability Test | |
|---|---|---|---|---|
| | Tensile Break Strength before Test [kg/cm$^2$] | Tensile Break Strength after Test [kg/cm$^2$] | Image before Test | Image after Test |
| Example 1 | 620 | 565 | Good | Good |
| Example 2 | 615 | 555 | Good | Good |
| Example 3 | 609 | 563 | Good | Good |
| Example 4 | 587 | 540 | Good | Good |
| Example 5 | 596 | 525 | Good | Good |
| Example 6 | 605 | 568 | Good | Good |
| Example 7 | 618 | 561 | Good | Good |
| Example 8 | 625 | 567 | Good | Good |
| Comp. Ex. 1 | 525 | 235 | Good | Uneven Transfer |
| Comp. Ex. 2 | 530 | 283 | Good | Uneven |

TABLE 1-continued

| Oil Resistance Test | | Durability Test | |
|---|---|---|---|
| Tensile Break Strength before Test [$kg/cm^2$] | Tensile Break Strength after Test [$kg/cm^2$] | Image before Test | Image after Test |
| | | | Transfer |

EXAMPLE 9

A mixture of 95 parts by weight of a polymer (viscosity average molecular weight $3.35\times10^4$) having the following structure:

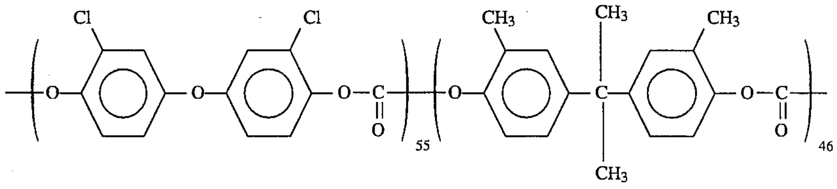

and 5 parts by weight of Ketjen Black EC (made by Ketjen Black International Company) having a specific surface area of 800 $m^2/g$ was pelletized by the use of a vented twin-screw extruder. The obtained pellets were press-molded into a transfer material supporting member of the present invention having a thickness of about 110 μm. The volume resistivity of this transfer material supporting member was $1.2\times10^{15}$ Ω.cm.

This transfer material supporting member was attached to the same cylinder 10 as in Example 1, and this cylinder 10 was further mounted on the same image forming device as in Example 1.

As a durability test, multi-color images were formed on 10,000 transfer materials with the same toner as in Example 1 by the use of the above-mentioned image forming device. The results of the durability test are shown in Table 2.

Furthermore, for the transfer material supporting member prepared in this example, an oil resistance test was made in the same manner as in Example 1. The results of the oil resistance test are shown in Table 2.

EXAMPLE 10

A transfer material supporting member of the present invention was obtained by the same procedure as in Example 9 except that a polymer used in Example 9 was replaced with a polymer (viscosity average molecular weight $2.21\times10^4$) having the structural formula:

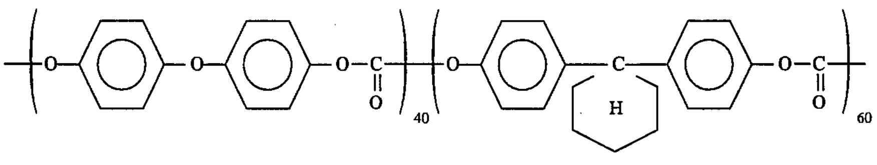

For the thus obtained transfer material supporting member, a durability test and an oil resistance test were made in the same manners as in Example 9. The results of the tests are shown in Table 2. In addition, the volume resistivity of this transfer material supporting member is shown in Table 2.

EXAMPLE 11

A transfer material supporting member of the present invention was obtained by the same procedure as in Example 9 except that a polymer used in Example 9 was replaced with a polymer (viscosity average molecular weight $3.01\times10^4$) having the structural formula:

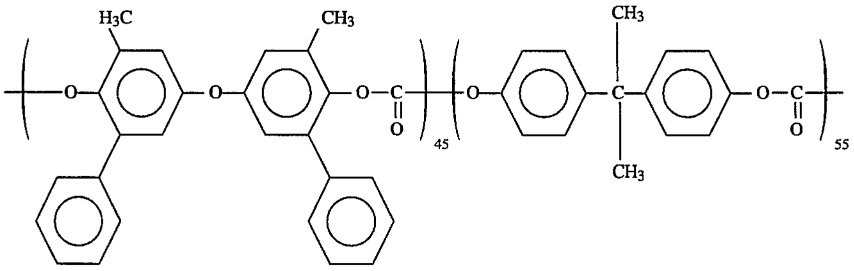

For the thus obtained transfer material supporting member, a durability test and an oil resistance test were made in the same manners as in Example 9. The results of the tests are shown in Table 2. In addition, the volume resistivity of this transfer material supporting member is shown in Table 2.

EXAMPLE 12

A transfer material supporting member of the present invention was obtained by the same procedure as in Example 9 except that a polymer used in Example 9 was replaced with a polymer (viscosity average molecular weight $3.85\times10^4$) having the structural formula:

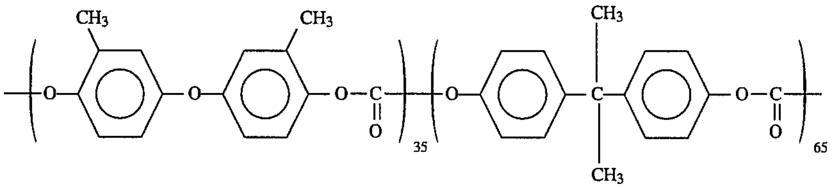

For the thus obtained transfer material supporting member, a durability test and an oil resistance test were made in the same manners as in Example 9. The results of the tests are shown in Table 2. In addition, the volume resistivity of this transfer material supporting member is shown in Table 2.

EXAMPLE 13

A transfer material supporting member having an endless belt structure of the present invention was obtained by forming a resin film of 105 μm in thickness from 94 parts by weight of a polymer (viscosity average molecular weight $2.58\times10^4$) having the structural formula

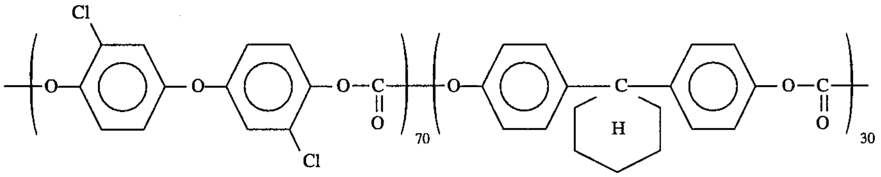

and 6 parts by weight of the same Ketjen Black EC as in Example 9, and then connecting both the ends of this resin film by thermal fusion bond.

The thus obtained transfer material supporting member was mounted on an image forming device shown in FIG. 4, and multi-color images were formed on 10,000 transfer materials with the same toner as in Example 1 for the sake of a durability test. The results of the durability test are shown in Table 2.

Furthermore, for the transfer material supporting member obtained in this example, an oil resistance test was made in the same manner as in Example 1. The results of the oil resistance test are shown in Table 2.

In addition, the volume resistivity of this transfer material supporting member is shown in Table 2.

EXAMPLE 14

A transfer material supporting member of the present invention was obtained by the same procedure as in Example 13 except that a polymer used in Example 13 was replaced with a polymer (viscosity average molecular weight $2.63\times10^4$) having the structural formula:

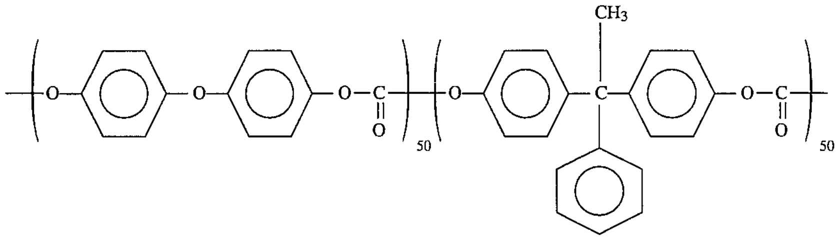

For the thus obtained transfer material supporting member, a durability test and an oil resistance test were made in the same manners as in Example 13. The results of the tests are shown in Table 2. In addition, the volume resistivity of this transfer material supporting member is shown in Table 2.

EXAMPLE 15

A transfer material supporting member of the present invention was-obtained by the same procedure as in Example 13 except that a polymer used in Example 13 was replaced with a polymer (viscosity average molecular weight $4.57\times10^4$) having the structural formula:

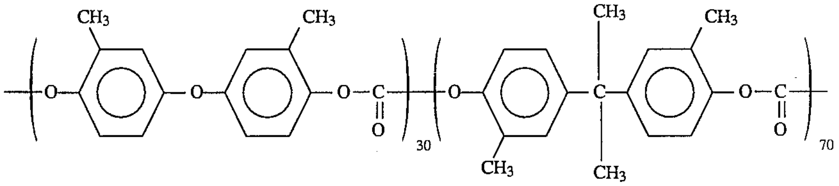

For the thus obtained transfer material supporting member, a durability test and an oil resistance test were made in the same manners as in Example 13. The results of the tests are shown in Table 2, In addition, the volume resistivity of this transfer material supporting member is shown in Table 2.

EXAMPLE 16

A transfer material supporting member of the present invention was obtained by the same procedure as in Example 13 except that a polymer used in Example 13 was replaced with a polymer (viscosity average molecular weight $2.75\times10^4$) having the structural formula:

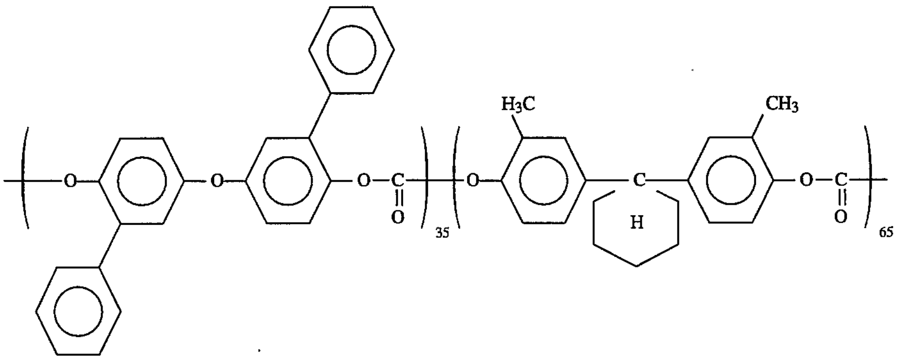

For the thus obtained transfer material supporting member, a durability test and an oil resistance test were made in the same manners as in Example 13. The results of the tests are shown in Table 2. In addition, the volume resistivity of this transfer material supporting member is shown in Table 2.

TABLE 2

| | | Oil Resistance Test | | Durability Test | |
|---|---|---|---|---|---|
| | Volume Resistivity [Ω · cm] | Tensile Break Strength before Test [kg/cm²] | Tensile Break Strength after Test [kg/cm²] | Image before Test | Image after Test |
| Example 9 | $1.2 \times 10^{15}$ | 598 | 553 | Good | Good |
| Example 10 | $9.8 \times 10^{14}$ | 601 | 545 | Good | Good |
| Example 11 | $8.7 \times 10^{14}$ | 587 | 544 | Good | Good |
| Example 12 | $1.5 \times 10^{15}$ | 611 | 538 | Good | Good |
| Example 13 | $2.3 \times 10^{15}$ | 603 | 556 | Good | Good |
| Example 14 | $3.1 \times 10^{15}$ | 599 | 552 | Good | Good |
| Example 15 | $9.5 \times 10^{14}$ | 588 | 531 | Good | Good |
| Example 16 | $1.4 \times 10^{15}$ | 608 | 557 | Good | Good |

What is claimed is:

1. A transfer material supporting member consisting essentially of a film formed mainly of a polymer represented by the formula (1):

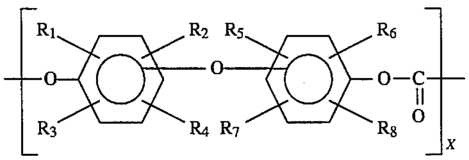

-continued

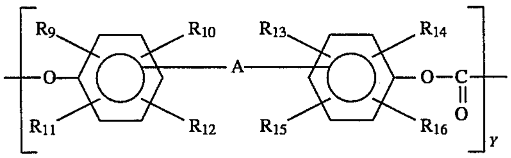

wherein each of $R_1$ to $R_{16}$ is a hydrogen atom, a halogen atom or an alkyl group, A is a divalent group, and each of X and Y is a copolymerization ratio.

2. The transfer material supporting member according to claim 1 wherein ratio of X:Y is in the range of 5:95 to 80:20.

3. The transfer material supporting member according to claim 1 wherein said transfer material supporting member has the form of a sheet.

4. The transfer material supporting member according to claim 1 wherein said transfer material supporting member has the form of an endless belt.

5. The transfer material supporting member according to claim 1 which contains electrically conductive fine particles.

6. The transfer material supporting member according to claim 5 wherein said electrically conductive fine particles are selected from the group consisting of conductive carbon blacks, ITO, $SnO_2$, $TiO_2$, $BaSO_4$ and metal particles.

* * * * *

UNITED STATES PATENT AND TRADEMARK OFFICE

CERTIFICATE OF CORRECTION

PATENT NO. : 5.470.940

DATED : November 28, 1995

INVENTOR(S) : NORIKO OTANI ET AL.

It is certified that error appears in the above-indentified patent and that said Letters Patent is hereby corrected as shown below:

COLUMN 4

Example (9) "$-CH_3-$" should read -- $-CH_2-$ --.

COLUMN 13

Line 53, "25" should read --50--.

COLUMN 14

Line 21, "(weight" should read --(viscosity--.

COLUMN 15

Line 25, "46" should read --45--.

COLUMN 19

Line 65, "was-obtained" should read --was obtained--.

Signed and Sealed this

Fourth Day of June, 1996

Attest:

BRUCE LEHMAN

Attesting Officer

Commissioner of Patents and Trademarks